United States Patent [19]

Chambers, Sr.

[11] 4,253,713
[45] Mar. 3, 1981

[54] HIGH INTEGRITY FLUID PRESSURE ROTARY SHAFT SEAL

[75] Inventor: Joseph W. Chambers, Sr., Santa Ana, Calif.

[73] Assignee: Disposable Waste Systems, Inc., Santa Ana, Calif.

[21] Appl. No.: 87,182

[22] Filed: Oct. 22, 1979

[51] Int. Cl.³ .............................................. F16C 33/78
[52] U.S. Cl. .................................. 308/187.1; 308/36.3
[58] Field of Search ................. 308/187.1, 187.2, 36.3, 308/36.2, 36.1, 189 R; 277/92, 96.2, 96, 3, 27

[56] References Cited

U.S. PATENT DOCUMENTS

| | | | |
|---|---|---|---|
| 3,101,200 | 8/1963 | Tracy | 277/96.2 |
| 3,752,243 | 8/1973 | Hummer et al. | 277/92 |
| 3,788,650 | 1/1974 | Place | 277/92 |
| 4,060,289 | 11/1977 | Gee et al. | 308/187.1 |

*Primary Examiner*—Lenard A. Footland
*Attorney, Agent, or Firm*—Sughrue, Rothwell, Mion, Zinn and Macpeak

[57] ABSTRACT

A neoprene boot fixes a static race of a rotary shaft seal within a housing bore. An annular rotating race bears a carbon insert laterally mated to the radial face of the static race. A bushing borne by the rotating shaft supports a neoprene seal sleeve of inverted T-shape configuration including a flexible lip reinforced with a steel ring which is pressed by distortion and fluid pressure against a rotating sleeve, to which the sleeve base is locked. The rotating race presses against the static race to maintain a high integrity fluid tight seal between the rotating shaft and the fixed housing.

5 Claims, 7 Drawing Figures

MACHINE CARBON BLANK TO "A" DIMENSION

100% WATER TIGHT BOND

MILL CARBON INSERT TO "B" DIMENSION

MACHINE LAP CARBON INSERT MATING SURFACE TO "B" DIMENSION

MACHINE LAP STATIC RACE MATING SURFACE TO "C" DIMENSION

HIGH INTEGRITY FLUID PRESSURE ROTARY SHAFT SEAL

FIELD OF THE INVENTION

This invention relates to rotary shaft seals, and more particularly, to an improved rotary shaft seal which utilizes fluid pressure to maintain the integrity of the seal between a rotating shaft and a relatively fixed housing supporting that shaft by means of an anti-friction bearing.

BACKGROUND OF THE INVENTION

It is conventional to mount a shaft for rotation on anti-friction bearings in which an inner bearing race, fixed to the shaft, rotates with the shaft, while an outer race is fixedly mounted to the housing and wherein ball bearings or other anti-friction bearing members are interposed between the two races. Such bearing structure is sufficient to properly maintain the shaft in rotation about its axis supported by the fixed housing and with a very low friction loss as a result of such mounting. Unfortunately, such bearing structures do provide sufficient sealability. Attempts have been made to provide pressure seals to one or both sides of the anti-friction bearing and between the fixed housing and the rotating shaft. Such rotary shaft seals to date have been complex, costly, and the seal integrity is difficult to maintain, particularly where relatively high pressures are exerted on the seal element maintaining a contact interface between the rotary and stationary elements of this type of seal. Where the fluids acting on the seal constitute liquids including abrasives and the like, the abrasion contact tends to destroy the seal or at least impair its integrity.

It is, therefore, an object of the present invention to provide an improved rotary shaft seal which is designed to meet requirements for specified dimension and materials in a wide variety of industry applications and which is applicable to gritty liquids, sewage, sludge, corrosive and abrasive and other problem fluids and which prevents the sludge and grit from working into the seal to destroy or collapse the interior mechanism.

It is a further object of this invention to provide an improved rotary seal which is simple in design and assembly, insures reliable performance, and which uses the pressure of the fluid acting on the seal to maintain the very integrity of the seal.

It is a further object of the invention to provide an improved rotary seal which eliminates the use of flushing sea water, grease cup, sealing liquid, springs, screws, and requires no internal or external adjustment, and in which installation is easily achieved without the requirement of special tools.

SUMMARY OF THE INVENTION

The invention is directed to an improved fluid pressure high integrity rotating seal for sealing of a shaft projecting through a housing bore and supported for rotation within said bore for rotation about its axis within said bore. An anti-friction bearing supports the shaft for rotation about its axis within the bore. An annular bushing is fixed to the shaft on the high pressure side of the housing adjacent the anti-friction bearing, the bushing is L-shaped in radial section including a base portion fixed to the shaft and bearing at the end remote from the anti-friction bearing, a radially outwardly projecting portion defining a radial shoulder. An annular static race is fixed to the housing radially outwardly of the base portion of the bushing and between the bushing radially projecting portion and the anti-friction bearing. The annular static race is peripherally recessed on its outer periphery adjacent the anti-friction bearing and bears an annular neoprene boot within the recess having an outside diameter slightly in excess of the inside diameter of the bore and being compressed between the annular static race and the fixed housing. A rotating annular race having an outside diameter less than the diameter of the bore is axially positioned between the annular static race and the radially projecting portion of the bushing. The rotating race bears an annular recess on its outer periphery, to the side facing the annular static race. An annular carbon insert ring is mounted within the annular recess of the rotating race and has an outer diameter equal to that of the rotating race and is of a width which is in excess of the axial length of the recess receiving the carbon insert ring. The opposed face of the carbon insert ring and the face of the static race are machine lapped preferably to three He light bands or better to insure an excellent seal between these contacting and relatively moving members. An annular resilient seal sleeve is frictionally mounted to and is locked to the inner periphery of the rotating ring and is of inverted T-shape radial cross-section. It includes a central, radially outwardly projecting part which bears internally an annular steel spring. Preferably, the face of the rotating race to the side opposite the static race is sloped radially inwardly towards the static race, and the axial length between the radial projecting portion of the wall of the bushing and the anti-friction bearing is such that the seal spring ring within the annular seal sleeve is deflected further in a direction away from the anti-friction bearing and towards the pressure side of the seal.

Preferably, an O-ring is provided on the outer periphery of the base portion of the bushing to insure fluid pressure sealing between the inner periphery of the seal sleeve and the bushing upon which the sleeve seats. The annular boot borne by the static race may be formed of rubber, Viton or other elastomeric material as may the seal sleeve. The bushing may be formed of stainless steel, as may the static and rotating races. The annular insert may be Union Carbide CNFJ or equivalent carbon graphite. The seal assembly may be incorporated with an anti-friction bearing which is of the sealed type.

DESCRIPTION OF THE PREFERRED EMBODIMENT

Figure 2:
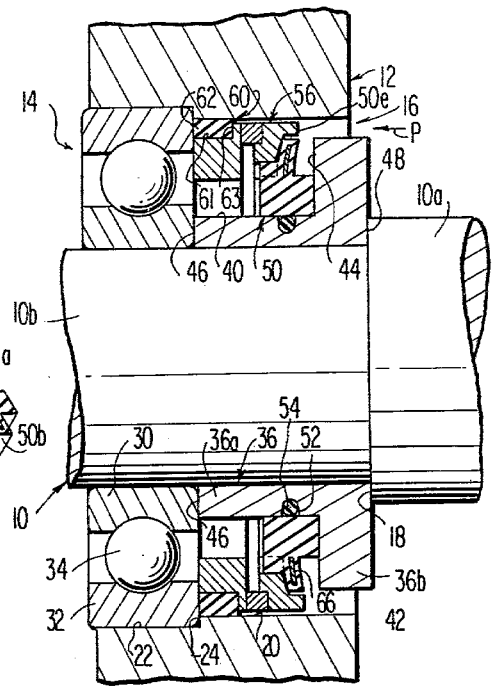
FIG. 2 is a sectional view of the rotary seal assembly of the present invention as applied to a shaft mounted for rotation within a housing by anti-friction bearings.

Referring to the drawings, there is shown a preferred embodiment of the present invention. In FIG. 2, a shaft 10 is supported for rotation within a housing 12 by means of an anti-friction bearing indicated generally at 14, the shaft including a reduced diameter portion 10b in the vicinity of support by the anti-friction bearing 14 and having a relatively enlarged diameter portion 10a to one side thereof forming a shoulder at 18.

The present invention is directed to an improved rotary seal assembly indicated generally at 16 and incorporated on the rotating shaft 10 between the shoulder 18 and the anti-friction bearing 14. The housing 12 is provided with a bore 20 which extends for a certain distance from the side of the housing bearing the larger diameter portion 10a of the shaft and being counterbored at 22 to form a shoulder 24 which receives the outer ring 32 of the anti-friction bearing 14. The anti-friction bearing 14 is a conventional ball bearing (preferably sealed) and further including an inner race 30 having an inner diameter slightly larger than the shaft portion 10b and being axially mounted thereto. A series of balls 34 are interposed between the races in conventional ball bearing fashion. Other types of bearings may be employed. The outer race 32 may have an outside diameter which is slightly in excess of the counterbore 22, and it may be force fitted to the housing 12. Thus, the inner race 10 rotates with the shaft, while the outer race 32 remains fixed.

A bushing indicated generally at 36 is L-shaped in radial section including a base portion 36a having a length equal to the distance between shoulder 18 of the shaft and the radial end of the inner race 30 of the anti-friction bearing 14. Further, the bushing 36 includes a radial end wall or radially projecting portion 36b at the end contacting shoulder 18 of shaft 10. The radially projecting portion 36b extends towards the bore 20 of the fixed housing 12 but stops short thereof. This forms a radial passage between the periphery 42 of the bushing radially projecting portion 36b and the bore 20 of the fixed housing 11, through which fluid under pressure, as indicated by arrow P, may enter the interior of the seal assembly 16. Thus, one end face 46 of the bushing 36 abuts the side of the inner race 30 of the anti-friction bearing 14, while the opposite end 48 abuts shoulder 18 of the shaft. The inner periphery 40 of the base portion 36a of the bushing bears an annular seal sleeve 50 which in turn supports for rotation and is locked to a rotating race 56, and the seal assembly is essentially completed by an annular static race 60 which is fixedly mounted within the housing bore 20, axially between the rotating sleeve and the fixed outer race 32 of the anti-friction bearing 14. In that respect, the static race 60 is provided with an annular recess 61 on its outer periphery to the side abutting the anti-friction bearing outer race 32. This recess 61 bears an annular elastomeric boot 62 of rectangular cross-section and having a width slightly in excess of the axial length of recess 61, such that the boot 62 is compressed axially between the shoulder 63 formed by that recess 61 and the side of the outer fixed race 32 of the anti-friction bearing 14 during assembly. Further, the outside diameter of the boot 62 is in excess of the diameter of bore 20 of the fixed housing 12 so as to be further compressed to insure a high fluid seal for the static race relative to the fixed race 32 of the anti-friction bearing 14 and the bore 20 of fixed housing 12.

Figure 1:
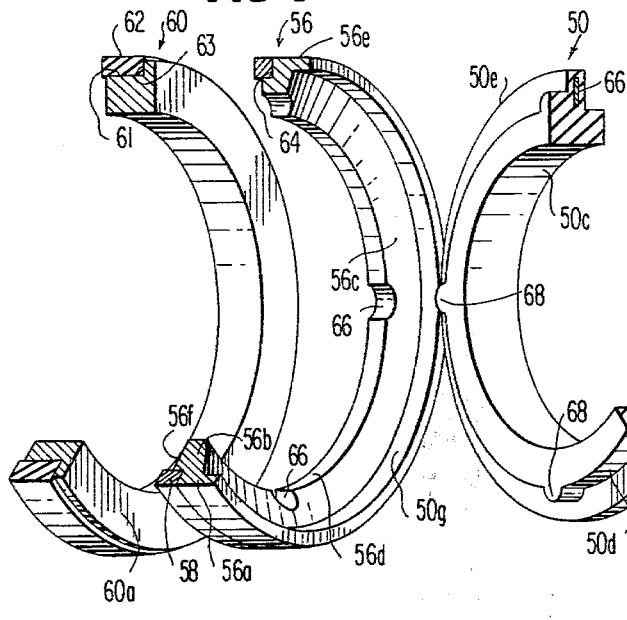
FIG. 1 is an exploded, perspective, cut away view of the principal components of the improved rotary seal assembly of the present invention.

The make up and construction of the rotating race 56 and the manner in which it is held in position and rotated with the shaft 10 by the seal sleeve 50 may be further appreciated by reference to FIG. 1. The rotating race, which is of modified L-shaped configuration, in radial sections includes an annular base portion 56a and a radially outwardly projecting portion at 56b at one axial end. The rotating race 56, which like the static race 60, may be formed of suitable metal such as stainless steel, is provided with an annular recess 64 on its outer periphery 56e on one side 56f, within which is epoxy bonded a machine carbon insert ring 58 having an inside diameter in slight excess to the diameter of the recess 64, and an outside diameter corresponding to the outside diameter of the rotating race itself. Further, the side 56c of the rotating race opposite side 56f is sloped or inclined from the inner periphery 56d to base portion 56a of that element. At four equally spaced circumferential positions, the inner periphery 56d of the rotating race is peripherally relieved to provide circular notches 66 which receive correspondingly dimensioned and formed drive lobes 68 integrally formed with the elastomeric seal sleeve 50, as radial projections thereof.

Contributing heavily to the sealing capability of the improved rotary shaft seal of the present invention is the annular seal sleeve 50. This member is generally of inverted T-shaped configuration, in radial cross-section, including a base portion 50a and a central radially projecting portion 50b. Interposed within the radially projecting portion 50b is a steel spring ring 66 constituting a planar element whose radial height is quite in excess of its axial width. The spring resists flexing of the radial projecting portion 50b from other than a position at right angles to the base portion 50a. The inner diameter 50c of the seal selve is equal to or slightly less than the outer diameter 40 of the base portion 36a of bushing 36, such that the seal sleeve frictionally grips the bushing base portion, upon which it rests with one side abutting shoulder 44 of the bushing. The outer periphery 50d of the base portion 50a of the seal sleeve is provided with drive lobes 68 and this outer periphery 50d corresponds exactly to the inner periphery 56c of the rotating race 56. With the sidewall 56c of the projecting portion 56b of the rotating seal race 56 inclined rather than being at right angles to the base portion 56a, only the edge 50e of the outer periphery of the seal sleeve contacts the side 56c of the rotating race. Under the constraint of the axial dimensions of the seal static race, the seal rotating race and the seal sleeve, as defined by the axial distance between the bushing shoulder 44 and the anti-friction bearing 14, the radial projecting portion 50b of the seal sleeve deflects and spring 66 tends to press the elastomeric seal sleeve against the side of the rotating race to which sleeve is mechanically locked by way of the notches 68 and the drive lobes 64 of respective members.

Preferably, outer periphery 40 of the base portion 36a of the bushing is grooved as at 52 to receive an O-ring 54 to insure a high integrity fluid seal between the seal sleeve and the bushing upon which it is mounted.

Figure 3A:
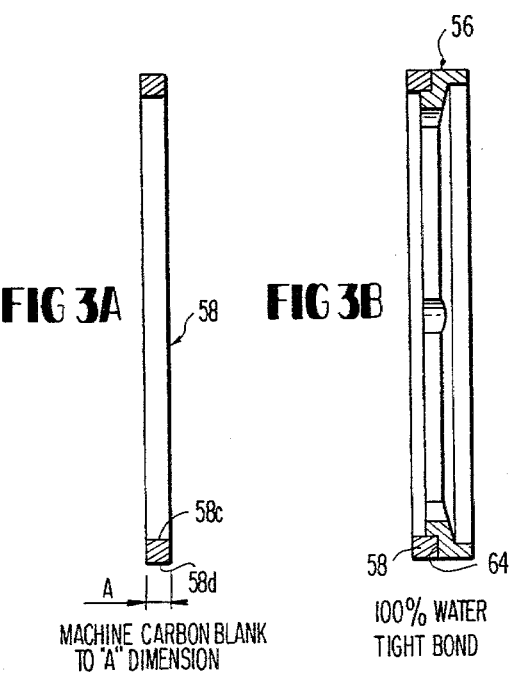
FIGS. 3a through 3d are sectional views in sequence of the formation of the rotating seal race forming an important element of the improved rotary seal assembly of the present invention.

An important aspect of the present invention is the nature in which contacting surfaces between the rotating race and the static race are machine milled and lapped to provide a very smooth surface of contact, one of relatively high seal but of low friction between these members. In the construction of the rotating race, as may be seen from FIGS. 3A to 3D, the carbon insert ring 58 is first machined to an accurate width (dimension A) FIG. 3A, from an annular blank. Additionally, the inner and outer diameters 58c and 58d of this member are required to be of relatively close dimensional tolerance to insure that the outer periphery 58d of the insert ring does not contact the bore 20 of the fixed housing and that the inner diameter 58c may be force fitted to the recess 64 within the rotating race 56. The sides are machined roughly to dimension A.

Figure 3B:
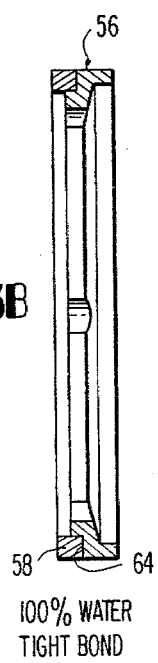
Figure 3C:
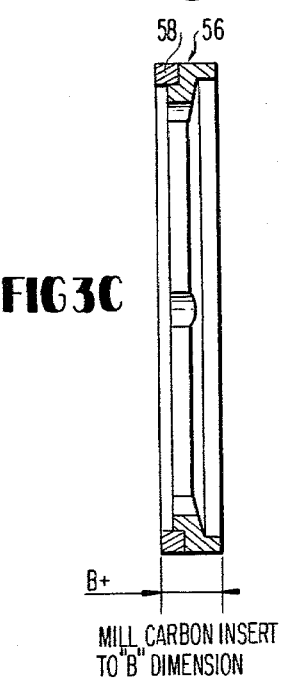
Figure 3D:
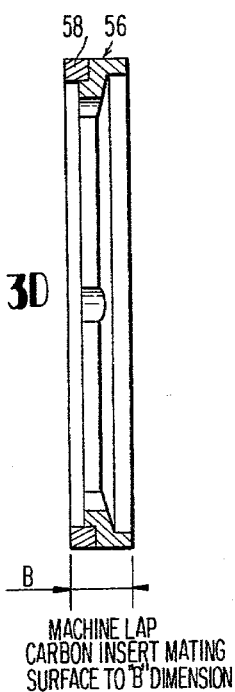

Turning next to FIG. 3B, a 100% water tight bond is effected between the carbon insert ring 58 and the seal rotating race 56 to which it is fitted via recess 64. In a third step, the axial end face of carbon insert ring 58 is milled such that the axial dimension of the rotating race with the carbon insert ring 58 is reduced to a B+ dimension as shown by the arrows, FIG. 3B. Finally, the end face 58a of the carbon insert ring 58 is machine lapped to the required B dimension to insure mating with the surface of the static race in contact therewith. The sleeve is serrated on its surfaces perpendicular to its center line.

Figure 4:
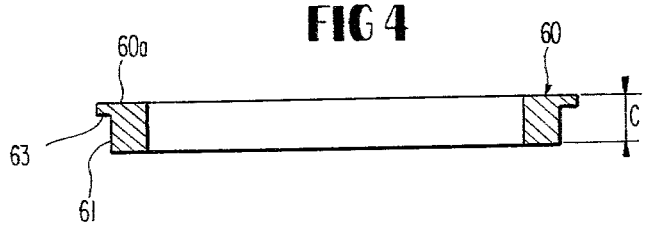
FIG. 4 is a sectional view of the static race as machined specifically for the assembly illustrated in FIG. 2.

Turning to FIG. 4, the radial face 60a of that member is machine lapped: the machine lapping providing a carbon flat to 3 He light bands or better and providing the finished axial width to the assembly of the seal rotating race and the carbon insert ring 58. The mating end face 60a of the seal static race at 60a is also machine lapped flat to 3 He light bands or better with a machine finish of 4 RMS finish (dimension C), all of this required to insure seal integrity along with the proper dimensioning of the seal sleeve, the maintaining of the spring pressure contact between the mating surfaces of the seal static race and the carbon insert ring face 58a borne by the seal rotating race. Further, fluid pressure as at P, FIG. 2, tends to maintain these elements in fluid sealed contact and prevents bypass of the fluid, particularly due to the elastomeric nature of the boot 62, the O-ring 54, and the neoprene seal sleeve 50.

While the invention has been particularly shown and described with reference to a preferred embodiment thereof, it will be understood by those skilled in the art that various changes in form and details may be made therein without departing from the spirit and scope of the invention.

What is claimed is:

1. An improved fluid pressure assisted, high integrity, rotating shaft seal assembly for sealing a shaft supported for rotation about its axis within a housing bore by an anti-friction bearing interposed between the shaft and the housing bore, said seal assembly comprising:
    an annular bushing fixed to said shaft adjacent the anti-friction bearing and on the high pressure side of the housing,
    said bushing being L-shaped in radial section and including a base portion fixed to the shaft and bearing on the end remote from the anti-friction bearing a radially outwardly projecting portion defining a radial shoulder facing said anti-friction bearing,
    an annular static seal race fixed to said housing radially spaced from the base portion of the bushing, overlying the bushing base portion and being axially spaced from the bushing radially projecting portion,
    said annular static seal race being peripherally recessed on its outer periphery to the side adjacent the anti-friction bearing,
    an annular neoprene boot within the recess, said boot having an outside diameter slightly in excess of the inside diameter of the bore and being compressed between the annular static seal race and the fixed housing,
    a rotating annular seal race having an outside diameter less than the diameter of the bore and being positioned on said bushing between said bushing radial shoulder and said annular static race,
    said rotating annular seal race bearing an annular recess on its outer periphery to the side facing the static seal race,
    an annular carbon insert ring sealably mounted within the annular recess of the rotating race and having an outer diameter equal to that of the rotating race and being of a width in excess of the axial length of the recess receiving the carbon insert ring,
    opposed end faces of said carbon insert ring and the static race being machine lapped to provide high integrity seal contact surfaces between these relatively moving members,
    an annular resilient seal sleeve locked to the inner periphery of the rotating ring and being mounted thereto and being of inverted T-shape radial cross-section, said annular resilient seal sleeve including a central radially outwardly projecting portion,
    an annular steel spring embedded within said seal sleeve radially outwardly projecting portion,
    the face of the rotating race to the side opposite the static race being configured, and the axial length between the radial projecting portion of the bushing and the anti-friction bearing, and the axial dimensions of said static race, said rotating race and said seal sleeve being such, that said seal spring ring within the annular steel sleeve is deflected in a direction away from the anti-friction bearing in the direction towards the high pressure side of the seal such that the fluid pressure acts simultaneously with said steel spring ring carried by said seal sleeve to maintain a high integrity seal between the rotating and static races of said seal assembly.

2. the rotary shaft seal assembly as claimed in claim 1, further comprising an annular groove formed within the outer periphery of the base portion of the bushing at a position underlying said annular resilient seal sleeve and an O-ring positioned within said annular groove and compressed between said seal sleeve and said bushing to further improve the integrity of the rotary shaft seal assembly.

3. The rotary shaft seal assembly as claimed in claim 2, wherein said housing is bored and counterbored to form a housing shoulder, said shaft includes a reduced diameter portion forming a shoulder on the high pressure side of the housing axially remote from the housing shoulder, said anti-friction bearing comprising an outer bearing race fixed to the housing and having one axial end face abutting the housing shoulder, and said bearing further including an inner bearing race fixed to said shaft and having an axial end face abutting one end of the L-shaped bushing opposite the end of the bushing abutting the shoulder of said shaft, and wherein the radially projecting portion of said bushing terminates in a diameter less than the diameter of said bore such that fluid pressure may enter the area intermediate of said bushing radially projecting portion for force application through radially outwardly projecting portion of said annular resilient seal sleeve to force the seal contact surfaces between the static race and the rotating race together in addition to the bias provided by said annular seal spring borne by said annular resilient seal sleeve radially projecting portion.

4. The rotary shaft seal assembly as claimed in claim 1, wherein said housing is bored and counterbored to form a housing shoulder, said shaft includes a reduced diameter portion forming a shoulder on the high pressure side of the housing axially remote from the housing shoulder, said anti-friction bearing comprising an outer bearing race fixed to the housing and having one axial end face abutting the housing shoulder, and said bearing further including an inner bearing race fixed to said shaft and having an axial end face abutting one end of the L-shaped bushing opposite the end of the bushing abutting the shoulder of said shaft, and wherein the radially projecting portion of said bushing terminates in a diameter less than the diameter of said bore such that fluid pressure may enter the area intermediate of said bushing radially projecting portion for force application through radially outwardly projecting portion of said annular resilient seal sleeve to force the seal contact surfaces between the static race and the rotating race together in addition to the bias provided by said annular seal spring borne by said annular resilient seal sleeve radially projecting portion.

5. The rotary shaft seal assembly as claimed in claim 1, wherein said seal sleeve base portion has an inner diameter somewhat less than the outer diameter of said bushing base portion such that the seal sleeve is frictionally maintained on said bushing and rotates with the bushing and the shaft driving the same, and wherein the outer periphery of the base portion of the seal sleeve is provided with a plurality of drive lobes constituting radial projections at circumferentially spaced positions on that member to the side of the sleeve facing the rotating race, and the rotating race includes an inner periphery on the order of the outer periphery of the base portion of said seal sleeve and wherein the inner periphery of the rotating race includes circumferentially spaced notches corresponding in size and configuration to said drive lobes such that said rotating race is mechanically locked to said seal sleeve and is driven thereby during rotation of said shaft.

* * * * *